UNITED STATES PATENT OFFICE.

WILLIAM DARLINGTON, OF GRASSENDALE, NEAR LIVERPOOL, ENGLAND.

FODDER FOR ANIMALS.

No. 903,683.     Specification of Letters Patent.     Patented Nov. 10, 1908.

Application filed August 21, 1908. Serial No. 449,717.

*To all whom it may concern:*

Be it known that I, WILLIAM DARLINGTON, subject of the King of Great Britain, residing at Grassendale, near Liverpool, in the county of Lancaster, in the Kingdom of England, have invented certain new and useful Improvements in Fodder for Animals, of which the following is a description.

This invention relates to an improved food or fodder for animals, such as horses, cattle, sheep, pigs, poultry, game and the like.

By the operation of the present invention a fodder is formed which has as its base apple pulp in a raw or untreated state, that is to say apple pulp which has not been treated with such reagents as sulfurous acid for preventing fermentation. The apple pulp which it is preferred to use is the waste product from the manufacture of cider which is at present thrown away or merely used for manuring purposes. Apple pulp very quickly ferments unless absolutely dry, and it is almost impossible to dry it except in extremely thin layers owing to its pulpy nature and it being such a poor conductor of heat, but I have found that when this material is mixed with farinaceous matter it becomes more friable and can easily be dried. Foot sugar, that is the uncrystallizable sugar or molasses remaining in the manufacture of beetroot and of even ordinary sugar is very deleterious to cattle unless mixed with humic acid, malic acid or one or two other acids when the strong alkaline nature of the foot sugar is neutralized. Now I have found that this apple pulp contains a large quantity of vegetable acid, especially malic acid, and this acid and the alkali of the foot sugar neutralize each other and make each much more wholesome for cattle than they are separately. Foot sugar indeed is absolutely poisonous to cattle if fed in large quantity unless mixed with one of these acids. To still further prevent injurious effect on the stomachs of the animals by the foot sugar and the apple pulp I prefer to add tonics as hereinafter described. This apple pulp or pomace is found to be very rich in phosphates, and to form the basis of an excellent food. Admixed with the apple pulp there is foot sugar or suitable sweetening matter, an oleaginous matter such as linseed, a farinaceous matter such as pea-meal (which also acts as a laxative), gentian powder, acting as a tonic, and grains of paradise, which is useful for preventing the fermentation of the food, and correcting the acidity of the apple pulp.

The ingredients other than the apple pulp or residue can be varied so long as the substitutes fulfil similar functions, for instance instead of pea meal, bean meal might be used as far as the farinaceous properties are required, but in this case a further laxative would have to be inserted, as bean meal is found to be rather costive in its properties. When the food is used for horses however the linseed or oleaginous matter must be omitted.

The method of manufacture is as follows:—The peas and linseed are first ground together so that the pea meal will absorb the oils expressed from the linseed. The mixture of pea meal and crushed linseed are then put with the remaining ingredients into a disintegrating, drying and mixing machine of any suitable type and mixed for a long enough period to insure the resulting product being a homogeneous compound.

While apple pulp has been mentioned as the base or principal ingredient of the food, it will be obvious that apples themselves could be used, but as a general use this would be more expensive, and further a larger proportion of grains of paradise or other matter would have to be introduced into the mixture to correct the acidity of the apple juice or cider which would remain in the food.

The actual composition at present used is composed as follows:—apple pulp 14 cwt., foot sugar 1½ cwt., linseed (whole) 4 cwt., 49 lbs., pea meal 1 cwt., gentian powder 4 lbs., grains of paradise 3 lbs. Of course the above proportions are merely given by way of example, as these may be varied.

I declare that what I claim is:—

1. A fodder for animals formed of apple pulp or pomace mixed with farinaceous matter and molasses, and dried.

2. A fodder for animals having as ingredients apple pulp or pomace, molasses and farinaceous matter, the whole thoroughly dried and granulated, and mixed with suitable tonics such as gentian powder and grains of paradise.

In witness whereof I have hereunto signed my name this 13th day of August 1908, in the presence of two subscribing witnesses.

WILLIAM DARLINGTON.

Witnesses:
G. C. Dymond,
T. S. Shillington.